M. N. HELGERSON.
WATERING TROUGH VALVE.
APPLICATION FILED DEC. 6, 1913.

1,099,800.

Patented June 9, 1914.

Melvin N. Helgerson,
Inventor

Witnesses by C. A. Snow & Co.
Attorneys

UNITED STATES PATENT OFFICE.

MELVIN N. HELGERSON, OF CLERMONT, IOWA.

WATERING-TROUGH VALVE.

1,099,800.        Specification of Letters Patent.        Patented June 9, 1914.

Application filed December 6, 1913. Serial No. 805,153.

*To all whom it may concern:*

Be it known that I, MELVIN N. HELGERSON, a citizen of the United States, residing at Clermont, in the county of Fayette and State of Iowa, have invented a new and useful Watering-Trough Valve, of which the following is a specification.

The present invention appertains generally to watering troughs for hogs, and other farm stock, and relates more particularly to an automatic or float controlled valve for opening and closing the supply pipe for the trough as the water level lowers and rises.

It is the object of the present invention to provide a novel and improved means for controlling the discharge of water from the supply pipe, into the trough, whereby the level of the water within the trough may be maintained at normal.

It is also the object of the present invention to provide an attachment for the end or nozzle of the supply pipe, including a valve coöperable with the end of the pipe or nozzle, and a float having means coöperating with the valve for closing the valve when the float rises to a predetermined position.

It is also within the scope of the present invention, to provide a device of the nature indicated, which will be comparatively simple, and inexpensive in construction, which may be readily applied to the end of a water supply pipe, and which shall be simple, practical and efficient in operation.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1:
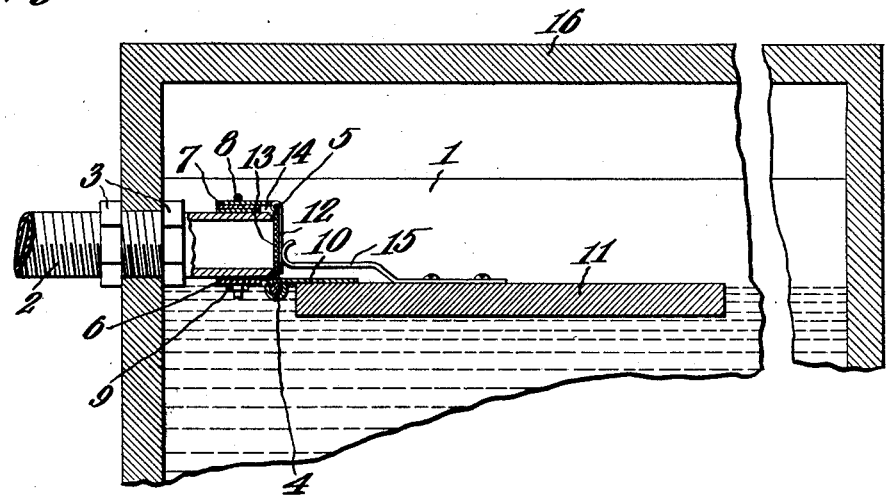
Figure 2:
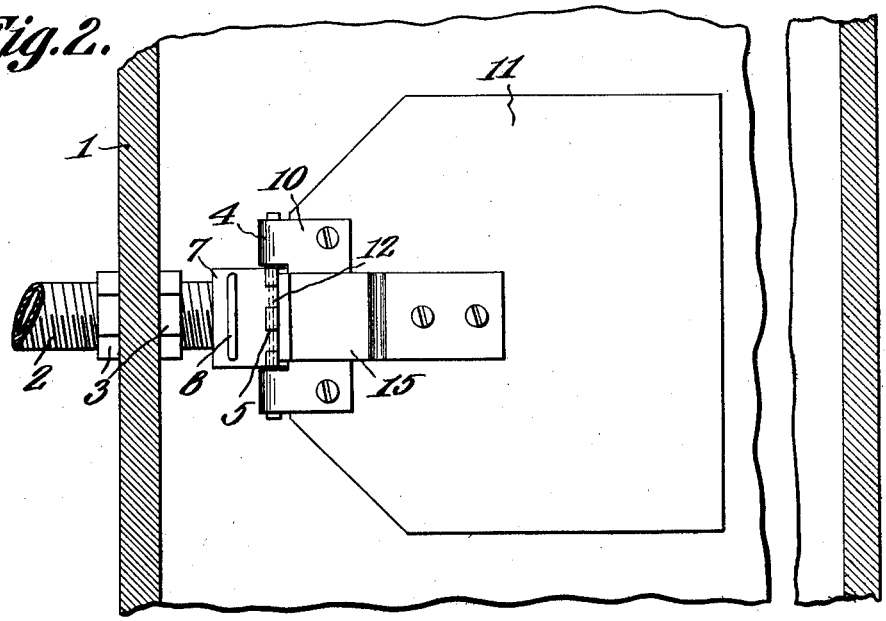

Figure 1 is a cross section of a watering trough embodying the present improvements. Fig. 2 is a plan view of the present device.

In the drawing, the numeral 1 designates a watering trough of any preferred construction, and the numeral 2 designates a water supply pipe passed through one side wall of the trough 1, and having a pair of clamping nuts 3 threaded thereon and engaging the opposite faces of the side wall of the trough, for holding the supply pipe in position, and for closing the opening through which the said pipe passes.

In carrying out the present invention, there are provided two hinge elements 4 and 5, one leaf, designated 6, of the hinge 4 resting against the bottom of the end or nozzle portion of the supply pipe 2, and one leaf, designated 7, of the hinge 5 resting upon the top of the said end of the supply pipe. A U-clip 8 has its arms engaged downwardly through the leaves 6 and 7 of the hinges, and has clamping nuts 9 threaded upon its extremities to clamp the leaves 6 and 7 upon the end or nozzle of the supply pipe. In this manner, the device is readily and conveniently attached to the end or nozzle of the supply pipe. The free leaf 10 of the hinge 4 has attached thereto, a flat float 11, which may be of wood or other buoyant material, the said leaf 10 and float 11 projecting beyond the end or nozzle of the supply pipe. The free leaf 12 of the upper hinge 5 depends over the end of the supply pipe 2, and has a packing disk 13 secured to its inner side or face, to seat against the end of the supply pipe, the leaf 12 and packing 13 serving as a flap valve to close the end or nozzle of the supply pipe. The end of the supply pipe is preferably beveled, as at 14, to present a relatively sharp edge for engagement with the packing 13 whereby a tight or effective closure of the supply pipe may be had, when the valve is seated. In order to seat the valve, when the float is raised, a leaf spring 15 is secured upon the float 11, and has its free end curved or bent back, and coöperating with the outer side or face of the flap or leaf 12.

The trough 1 may be provided with a bridge portion 16 above the float 11 and valve 12, for protecting the same, while the end portions of the trough, are unencumbered whereby the stock may have ready access to the water at all points save that portion adjoining the float 11, in order that the stock may not interfere with the operation of the present device.

In operation, as the water level lowers within the trough, the float 11 will gravitate or swing downwardly, and as a result, the leaf spring or pressing element 15 will swing away from the end of the supply pipe, and will permit the valve to swing open under the pressure of the water within the supply pipe, in order that the water may flow from the supply pipe into the trough. Then, when the water level raises to a predetermined height, the float in being raised will cause the valve to be seated or closed, inasmuch as the spring or finger 15 will press the valve against the end of the supply pipe, or nozzle.

The present device will thus serve to maintain the level of the water within the trough at normal, the other advantages and capabilities of the present device being apparent from the foregoing, taken in connection with the drawing, and it being noted that the objects aimed at have been carried out satisfactorily.

Having thus described the invention, what is claimed as new is:—

1. The combination with a supply pipe, of a pair of hinge elements, means for attaching one leaf of each hinge element over the end portion of the pipe, the free leaf of one hinge element serving as a flap valve seatable against the end of the pipe, a float attached to the free leaf of the other hinge element, and a member carried by the float and coöperable with the outer side of the first mentioned free leaf.

2. The combination with a supply pipe, of a pair of hinge elements, one leaf of one of the hinge elements resting against the top of the end portion of the pipe and one leaf of the other hinge element resting against the bottom of the end portion of the pipe, clamping means connecting the said leaves, the upper free leaf depending over the end of the pipe to serve as a flap valve, a float attached to the lower free leaf, and a member carried by the float and coöperable with the outer side of the upper free leaf.

In testimony that I claim the foregoing as my own, I have hereto affixed my signature in the presence of two witnesses.

MELVIN N. HELGERSON.

Witnesses:
  NELS T. HELGERSON,
  ELMER HAUG.

---

Copies of this patent may be obtained for five cents each, by addressing the "Commissioner of Patents, Washington, D. C."